United States Patent

Ecoff et al.

[11] Patent Number: 5,942,326
[45] Date of Patent: Aug. 24, 1999

[54] SHRINK FILM WITH GOOD INK ADHESION

[75] Inventors: Martin J. Ecoff; Tracie P. Segura, both of Greer; Daniel S. Wilburn, Simpsonville, all of S.C.

[73] Assignee: Cryovac, Inc., Duncan, S.C.

[21] Appl. No.: 08/853,845

[22] Filed: May 9, 1997

Related U.S. Application Data

[60] Provisional application No. 60/019,430, Jun. 7, 1996.

[51] Int. Cl.$^6$ .......................... B32B 27/30; B32B 27/32; B32B 31/22

[52] U.S. Cl. .......................... 428/341; 264/563; 264/565; 264/567; 428/195; 428/200; 428/451; 428/515; 428/516; 428/520; 428/910

[58] Field of Search ................................. 264/563, 565, 264/567; 428/195, 200, 206, 207, 451, 341, 515, 516, 520, 910; 493/187

[56] References Cited

U.S. PATENT DOCUMENTS

| | | | |
|---|---|---|---|
| 4,551,380 | 11/1985 | Schoenberg | 428/218 |
| 4,612,245 | 9/1986 | Mueller et al. | 428/340 |
| 4,617,241 | 10/1986 | Mueller | 428/520 |
| 4,983,447 | 1/1991 | Crass et al. | 428/216 |
| 5,436,041 | 7/1995 | Murschall et al. | 428/34.2 |
| 5,614,297 | 3/1997 | Velazquez | 428/218 |

FOREIGN PATENT DOCUMENTS

| | | |
|---|---|---|
| 0 071 349 | 2/1983 | European Pat. Off. . |
| 0 285 444 | 10/1988 | European Pat. Off. . |
| 0 286 430 | 10/1988 | European Pat. Off. . |
| 0 388 177 | 9/1990 | European Pat. Off. . |
| 2 115 348 | 2/1983 | United Kingdom . |

*Primary Examiner*—D. S. Nakarani
*Attorney, Agent, or Firm*—Mark B. Quatt

[57] ABSTRACT

A film, having two major surfaces, includes an outer layer including a copolymer of ethylene and a $C_3$ to $C_{10}$ alpha olefin, wherein at least one surface has a silicone coating of between 0.1 and 1.2 milligrams per square feet. Multilayer films can also be provided. Films with a combination of good machinability and ink adhesion are obtained. Films with good shrink properties, in combination with good machinability and ink adhesion, are also obtained.

23 Claims, 1 Drawing Sheet

SHRINK FILM WITH GOOD INK ADHESION

This application claims the benefit of U.S. Provisional Application Ser. No. 60/019,430, filed Jun. 7, 1996.

BACKGROUND OF THE INVENTION

This invention relates to thermoplastic films for packaging applications, and more particularly relates to multilayer films which are machinable and have superior ink adhesion properties.

Thermoplastic film, and especially polyolefin materials, have been used in the past to package various articles including perishable food products which require resistance to physical and environmental abuse during storage and distribution, and an aesthetic and attractive appearance. Machinability of the film is required for it to be useful in the automated, relatively high speed production of multiple packages. Good shrink characteristics are necessary to produce a tight package appearance. Memory or package tightness retention is a measure of how well the packages then maintain the initial tight appearance. Such characteristic is important because packages typically must endure a distribution cycle which may range from a few days to a few weeks prior to being viewed by the final consumer. Ink adhesion is a measure of the printability of the film and is important for any printed package.

In the past a film useful in the packaging of poultry as well as other products and having excellent physical properties including good machinability, shrink and memory properties has been commercially available as SSD 310 film from Cryovac Division of W. R. Grace & Co.-Conn. However, there exists a need for a film having improved ink adhesion properties as compared to this commercial film.

The present invention meets this need with a multilayer film which provides adequate machinability, shrink, optics, and memory properties, while also providing improved ink adhesion properties.

SUMMARY OF THE INVENTION

In one aspect of the invention, a polymeric film, the film having two major surfaces, comprises an outer layer comprising a copolymer of ethylene and a $C_3$ to $C_{10}$ alpha olefin, wherein at least one of the major surfaces has a silicone coating of between 0.1 and 1.2 $mg/ft^2$.

In a second aspect a multilayer polymeric film, the film having two major surfaces, comprises a first outer layer comprising a copolymer of ethylene and a $C_4$ to $C_8$ alpha olefin; a second outer layer comprising a copolymer of ethylene and a $C_4$ to $C_8$ alpha olefin; and a core layer, disposed between the first and second outer layers, comprising an olefinic polymer different from the copolymer of the first and second outer layers; wherein at least one major surface of the film has a silicone coating of between 0.1 and 1.2 $mg/ft^2$.

In a third aspect a multilayer polymeric film comprises a first outer layer comprising a copolymer of ethylene and a $C_3$ to $C_{10}$ alpha olefin; a first intermediate layer comprising an olefinic polymer; a core layer comprising a copolymer of ethylene and a $C_3$ to $C_{10}$ alpha olefin; a second intermediate layer comprising an olefinic polymer; and a second outer layer comprising a copolymer of ethylene and a $C_3$ to $C_{10}$ alpha olefin; wherein the olefinic polymer of the first and second intermediate layers differs from the copolymer of the first and second outer layers, and the core layer; and wherein at least one surface of the film has a silicone coating of between 0.1 and 1.2 $mg/ft^2$.

In a fourth aspect, a method of making a film comprises extruding a polymeric extrudate, the extrudate having two major surfaces, comprising an outer layer comprising a copolymer of ethylene and a $C_3$ to $C_{10}$ alpha olefin; and coating at least one major surface of the extrudate with a coating of silicone at a concentration of between 1 and 10 $mg/ft^2$.

DEFINITIONS

As used herein, the term "polymer" refers to the product of a polymerization reaction, and is inclusive of homopolymers, copolymer, terpolymers, etc.

As used herein, the term "copolymer" refers to polymers formed by the polymerization reaction of at least two different monomers.

As used herein, the term "olefinic polymer" and the like refers to any olefin polymer or copolymer, which can be linear, branched, cyclic, aliphatic, aromatic, substituted, or unsubstituted.

As used herein, the phrase "ethylene/alpha-olefin copolymer" refers to such heterogeneous materials as linear low density polyethylene (LLDPE), linear medium density polyethylene (LMDPE) and very low and ultra low density polyethylene (VLDPE and ULDPE); and homogeneous polymers such as metallocene catalyzed polymers such as EXACT (™) materials from Exxon, TAFMER (™) materials from Mitsui Petrochemical, and AFFINITY (M) resins from the Dow Chemical Company. These materials generally include copolymers of ethylene with one or more comonomers selected from $C_4$ to $C_{10}$ alpha-olefins such as butene-1 (i.e., 1-butene), hexene-1, octene-1, etc. in which the molecules of the copolymers comprise long chains with relatively few side chain branches or crosslinked structures. This molecular structure is to be contrasted with conventional low or medium density polyethylenes which are more highly branched than their respective counterparts. LLDPE, as used herein, has a density in the range of from 0.915 grams per cubic centimeter to 0.925 grams per cubic centimeter. LMDPE has a density in the range of from 0.926 g/cc to 0.94 g/cc and VLDPE or ULDPE has a density below 0.915 g/cc.

As used herein, the term "ethylene/vinyl acetate copolymer" or "EVA" is used to refer to a copolymer formed from ethylene and vinyl acetate monomers wherein the ethylene derived units in the copolymer are present in major amounts, preferably between 60% and 98% by weight and the vinyl acetate derived units in the copolymer are present in minor amounts, preferably between 2% and 40% by weight As used herein, the term "polypropylene" refers to any polymer comprising propylene polymerization units, regardless of whether the polymer is a homopolymer or a copolymer, and further includes blends of such homopolymer and copolymer.

As used herein, the term "thermoplastic polyolefin" or "TPO" refers to a continuous phase of isotactic propylene homopolymer and a dispersed phase of ethylene propylene rubber.

As used herein, the phrase "outer layer" refers to any film layer, of a multilayer film, having only one of its principal surfaces directly adhered to another layer of the film.

As used herein, the term "core", and the phrase "core layer", as applied to multilayer films, refer to any internal film layer, often a central layer, which has a primary function other than serving as an adhesive or compatibilizer for adhering two layers to one another. Usually, the core layer or layers provide the multflayer film with a desired level of strength, i.e., modulus.

As used herein, the term "sealed" refers to any and all means of closing a package, such as heat sealing via hot air and/or heated bar, ultrasonic sealing, and even the use of clips on, for example, a shirred casing, etc.

As used herein, the phrase "sealant layer" or "sealing layer", with respect to multilayer films, refers to an outer film layers, which are involved in the sealing of the film to itself or another layer. The phrase "sealant layer" as herein used refers only to outer layers, no matter how thin. With respect to packages having lap seals, the phrase "sealant layer" generally refers to both of the outer film layers of a package, as well as supporting layers adjacent to these sealant layers.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions.

As used herein, the phrase "orientation ratio" refers to the multiplication product of the extent to which the plastic film material is expanded in several directions, usually two directions perpendicular to one another.

BRIEF DESCRIPTION OF THE DRAWINGS

The invention may be further understood with reference to the drawings in which.

DESCRIPTION OF THE PREFERRED EMBODIMENTS

Figure 1:
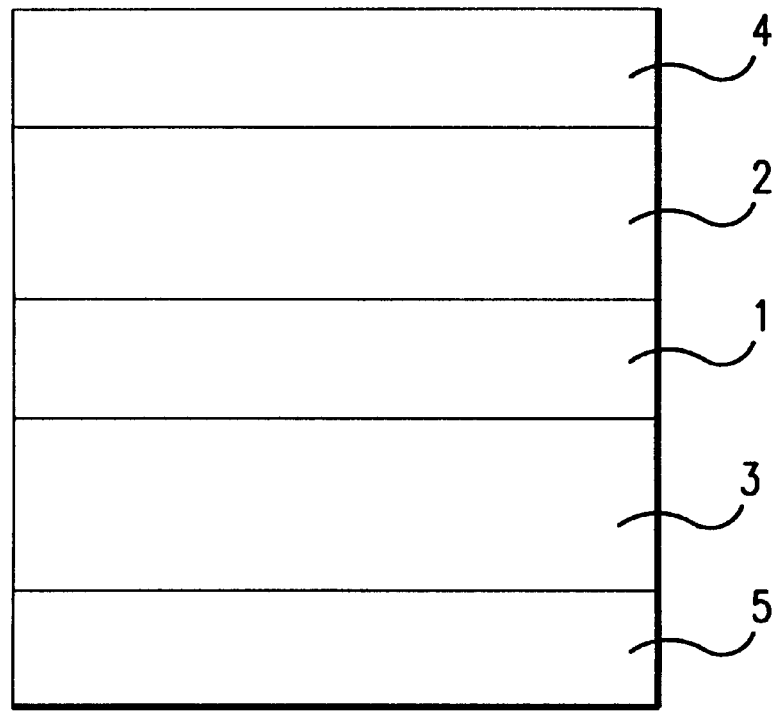
FIG. 1 discloses a schematic cross section of a film in accordance with the invention.

Referring to FIG. 1, which is a cross-sectional view of a five layer preferred embodiment of the present invention, it is seen that this embodiment comprises a core layer 1, two adjacent intermediate layers 2 and 3 and two outer or surface layers 4 and 5. The preferred thickness ratio of the five layer film is 1/1.5/1/1.5/1.

The outer layers 4 and 5 of the present multilayer structure comprise a copolymer of ethylene and a $C_4$ to $C_{10}$ alpha olefin, such as 1-butene, 4-methyl pentene, 1-hexene, and 1-octene, and preferably comprise a linear copolymer of ethylene and hexene such as Escorene LL3001.63 or Escorene LL3001.32, both being an ethylene/hexene copolymer having a density of 0.918 g/cc and a melt index of 1.0, supplied by Exxon. However, ethylene/hexene copolymers of differing density, melt index or homogeneity are also within the scope of the present invention. For example, although Escorene LL3001.63 is a heterogeneous resin, homogeneous ethylene/hexene copolymer are also within the scope of the present invention. Similarly, ethylene/hexene copolymer having densities as low as 0.912 g/cc or as high as 0.935 g/cc may be employed, although densities ranging from 0.915 to 0.920 are preferred. Further, while it is preferred that the compositions of outer layers 4 and 5 are the same, differing ethylene/hexene copolymer or blends thereof may be employed for each outer layer.

Core layer 1 comprises an olefinic polymer or copolymer. Preferred olefins are ethylene homopolymers and copolymers such as low density polyethylene, high density polyethylene, or any of a variety of ethylene copolymers including, for example, ethylene/vinyl acetate copolymer, ethylene/acrylate copolymer, ethylene/acrylic acid copolymer including metal neutralized salts thereof, and ethylene/alpha-olefin copolymer. Core layer 1 preferably comprises a linear ethylene/hexene copolymer and most preferably comprises the same ethylene/hexene copolymer as that employed in outer layers 4 and 5. Also within the scope of the present olefinic polymer are propylene based resins such as polypropylene, propylene ethylene copolymer, and thermoplastic polyolefin resins (TPO) as defined above.

As with core layer 1 discussed above, the compositions of the intermediate layers 2 and 3 may vary depending on the particular end-use application contemplated. Thus, any desired polyolefin, particularly any desired ethylene polymer such as low density polyethylene, high density polyethylene, or any of a variety of ethylene copolymers including, for example, ethylene/vinyl acetate copolymer, ethylene/ acrylate copolymer, ethylene/acrylic acid copolymer including metal neutralized salts thereof, and ethylene/alpha-olefin copolymer which are different from the ethylene/hexene copolymer of the outer layers can also be used in the intermediate layers 2 and 3 of the present multilayer structure. Similarly, the intermediate layers may comprise a propylene based resin such as polypropylene, a propylene ethylene copolymer, or a thermoplastic polyolefin resin as defined above. Intermediate layers 2 and 3 preferably comprise an ethylene/vinyl acetate copolymer, such as PE 1335, an ethylene/vinyl acetate copolymer having 3.3% by weight of vinyl acetate, supplied by Rexene. An even more preferable ethylene/vinyl acetate copolymer is PE 5269T from Chevron having 6.5% by weight of vinyl acetate. Other ethylene/vinyl acetate copolymer or blends of two or more ethylene/vinyl acetate copolymers can be utilized in intermediate layers 2 and 3. For example, depending on the composition of core layer 1, modified ethylene/vinyl acetate copolymer or some other modified polyolefin can be used.

Figure 2:
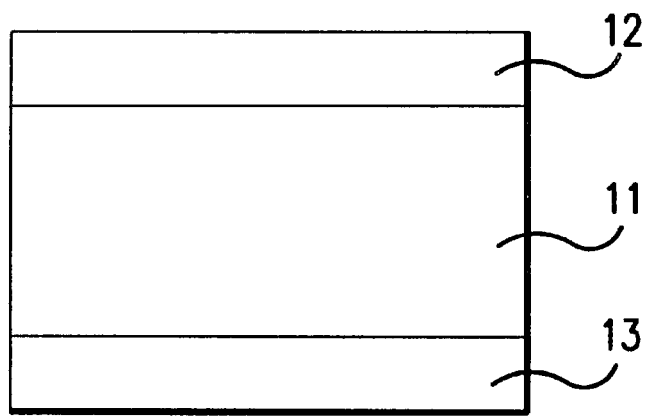
FIG. 2 shows an alternative embodiment of such a film.

A three-layer film is also within the scope of the present invention. Such film structure as illustrated in FIG. 2 has a single core layer 11 and two outer layers 12 and 13, preferably having a thickness ratio of the three layers of 1/2/1. The outer layers are as disclosed above for the five layer structure.

The core layer is preferably an ethylene/vinyl acetate copolymer, such as PE 1335 from Rexene, or other ethylene/vinyl acetate copolymer or blends of ethylene/vinyl acetate copolymers. An even more preferable ethylene/vinyl acetate copolymer for the core layer is PE 5269T from Chevron having 6.5% by weight of vinyl acetate. The core layer may vary depending on the particular end-use application contemplated. Any desired olefinic polymer, particularly any desired ethylene polymer such as low density polyethylene, high density polyethylene, or any of a variety of ethylene copolymers including, for example, ethylene/vinyl acetate copolymer, ethylene acrylate copolymer, ethylene acrylic acid copolymer including metal neutralized salts thereof, ethylene/alpha-olefin copolymer which are different from the ethylene/hexene copolymer of the outer layers, propylene based resins such as polypropylene, propylene ethylene copolymer, and thermoplastic polyolefin resin, can also be used in the core layer of the present three layer structure.

The present film can be considered to include outer layers of an ethylene/hexene copolymer and at least one internal layer wherein the total composition of the film is from 5% to 95%, preferably 25% to 75%, most preferably 45% to 55% by weight of an ethylene/hexene copolymer, and from 5% to 95%, preferably from 25% to 75%, most preferably from 45% to 55% by weight of an olefinic polymer different from the ethylene/hexene copolymer of the outer layers. Optimally, the total film composition is about 50% by weight of an ethylene/hexene copolymer and about 50% by weight of an olefinic polymer different from the ethylene/hexene copolymer of the outer layers.

Additional layers and/or minor additives of the types described above may be added to the film of the present invention as desired but care must be taken not to substantially affect the desirable physical properties and other characteristics of the inventive film.

In the preferred process for making the multilayer film of the present invention the basic steps are coextruding the layers to form a multilayer film, and then stretching the film to biaxially orient the film. These steps and additional desirable steps will be explained in detail in the paragraphs which follow.

The process begins by blending, if necessary, the raw materials (i.e., polymeric resins) in the proportions and ranges desired as discussed above. The resins are usually purchased from a supplier in pellet form and can be blended in any one of a number of commercially available blenders as is well known in the art During the blending process any additives and/or agents which are desired to be utilized are also incorporated.

The resins and applicable additives and/or agents are then fed to the hoppers of extruders which feed a coextrusion die. For the preferred five-layer film having two identical surface layers, a core layer which is identical to the surface layers, and two identical intermediate layers, at least two extruders need to be employed: one for the two outer or surface layers and the core layer and one for the two intermediate layers. Additional extruders can be employed if a film having non-identical intermediate layers is desired. The materials are coextruded as a relatively thick tube or extrudate, sometimes referred to as "tape" which has an initial diameter dependent upon the diameter of the coextrusion die.

Circular coextrusion dies are well known to those in the art and can be purchased from a number of manufacturers. In addition to tubular coextrusion, slot dies could be used to coextrude the material in sheet form. Well known single or multilayer extrusion coating processes could also be utilized, if desired.

The extrudate is then quenched and cooled.

The internal surface of the tubular extrudate is then sprayed with a fine mist of silicone at a concentration of preferably between 1 and 10 milligrams/square foot (mg/ft$^2$), more preferably between 5 and 10 mg/ft$^2$, such as between 7 and 9 mg/ft$^2$. Such treatment prevents the tape from welding to itself during the manufacturing process.

An additional process step which can optionally be utilized to manufacture the preferred embodiment of the presently inventive film is to crosslink the extrudate or unexpanded tubing or sheet, preferably by bombarding it with highenergy electrons from an accelerator to crosslink the materials of the tube. Crosslinking increases the structural strength of the extrudate or the force at which the material can be stretched before tearing apart when the film materials are predominately ethylene such as polyethylene or ethylene/vinyl acetate copolymer. Irradiation also improves the optical properties of the film and changes the properties of the film at higher temperatures. A preferred irradiation dosage level is in the range of from 50 kGy to 150 kGy. A more preferred dosage level is in the range of 75 to 125 kGy. The most preferred dosage level is approximately 100 kGy. Crosslinking by other methods, such as chemical crosslinking through the use of peroxides, is also within the scope of the present invention.

Following coextrusion, quenching to cool, spraying the interior of the tubular extrudate with the silicone, and optional crosslinking of the tape, the extruded tape is reheated and inflated, by application of internal air pressure, into a bubble, thereby transforming the narrow tape with thick walls into a wide film with thin walls of the desired thickness and width. This process is sometimes referred to as the "trapped bubble" technique of orientation. The orientation process orients the film by stretching it transversely and longitudinally and thus imparts shrink capabilities to the film. Additional longitudinal or machine direction orientation can be accomplished by revolving the deflate rollers which aid in the collapse of the "blown bubble" at a greater speed than that of the rollers which serve to transport the reheated "tape" to the orientation area. Preferred transverse and longitudinal orientation ratios of the present film range from 2.5:1 transverse by 3.0:1 longitudinal to 5.0:1 transverse by 5.0:1 longitudinal. A particularly preferred orientation ratio is 3.3:1 transverse by 3.3:1 longitudinal.

The final diameter of the tubular film is dependent upon the orientation ratio.

Preferably, following orientation the film is annealed. Annealing is a heat treatment which changes the physical properties of the film. This is achieved by passing the unrestrained film over a series of heated rollers to shrink the film approximately 2% to 5% in the machine and transverse directions. This reduces some of the low temperature shrink left in the film after orientation and gives dimensional stability to the finished roll of film during storage.

After stretching and optional annealing, the tubular film is collapsed onto a roll. Thereafter, the roll is unwound, and slit at its folded edges to create two plies. The two plies are separated, each wound onto a separate take-up roll. Thus, on each take up roll, silicone from the treated surface transfers to the untreated surface of the wound film. It has been advantageously found, in accordance with the present invention, that this silicone coating aids in the machinability of the final film. Thus, the final film will have a silicone coating, on at least one surface thereof, of between 0.1 and 1.2 mg/ft$^2$, more preferably between 0.3 and 1.0 mg/ft$^2$, most preferably between 0.4 and 0.8 mg/ft$^2$.

To further disclose and clarify the scope of the present invention to those skilled in the art the following test data are presented.

EXAMPLE 1

In accordance with the present invention, a five layer film was coextruded having the following structure and relative percent thickness:

*LLDPE1 / EVA1 / LLDPE1 / EVA1 / LLDPE1*

16.67% / 25% / 16.66% / 25% / 16.67% wherein LLDPE1 is Exxon Escorene LL3001.63 and EVA1 is Rexene PE 1335. The tape was electronically crosslinked at approximately 111 kGy and oriented at an orientation ratio of 3.4 longitudinally by 3.2 in the transverse direction. Prior to crosslinking, one of the outer surfaces was treated with a silicone spray at 4.2 mg/ft$^2$. The film was slit and taken up in single wound rolls such that the silicone treated layer was immediately adjacent to the untreated layer on the roll.

EXAMPLE 2

A film was prepared in accordance with Example 1. However, the film was taken up on double wound rolls such that the two silicone treated inner layers were immediately adjacent to each other on the roll.

COMPARATIVE EXAMPLE 3

A film was prepared in accordance with Example 1. However, instead of a silicone spray treatment the inner layer was treated with a mist of polysorbate 80.

COMPARATIVE EXAMPLE 4

A commercially available film was coextruded having the following structure and relative percent thicknesses:

*EVA1 / LLDPE2 / EVA1 / LLDPE2 / EVA1*

16.67% 25% 16.66% 25% 16.67% wherein EVA1 is PE 1335, as above, and wherein LLDPE2 is Dowlex 2045, an ethylene octene copolymer having a density of about 0.920 g/cc supplied by the Dow Chemical Company. The tape was electronically crosslinked at approximately 111 kGy and oriented at an orientation ratio of 3.4 longitudinally by 3.2 in the transverse direction. Prior to crosslinking, one of the outer surfaces was treated with a silicone spray at 4.2 mg/ft$^2$. The film was slit and taken up in single wound rolls such that the silicone treated outer layer was immediately adjacent to the untreated layer on the roll.

A variety of physical properties were measured for the films of Example 1 and Comparative Examples 3 and 4. The results are set forth in Table I, below.

For Example 1 and Comparative Example 4 the results of an early study are included in parentheses. It should be noted that the transverse shrink measured for the film of Example 1 in the earlier test is believed to be low, most probably because the annealer employed during manufacture of the film had not yet achieved steady state operation and was over-annealing the film.

It is interesting to note in reviewing the data set forth in Table I that the surface energy measurements for the present inventive film were substantially equivalent to, and certainly no better than, the surface energy numbers obtained for the film of Comparative Example 4. Generally it is considered that higher surface energy measurements are indicative of superior ink adhesion characteristics. Thus, it is surprising that the films of the present invention generally outperformed the comparative film in the ink adhesion tests and press trial set forth below. The surface energy measurements obtained during physical property testing were not indicative of good ink adhesion.

An unexpected advantage obtained by the film of the present invention is the improved shrink as compared to that of the comparative film, as is also evidenced in Table I. It is believed that such improved shrink may be at least one factor in the improved package tightness retention which has also been unexpectedly achieved by the film of the present invention and which is discussed below.

TABLE I

| Property | Ex. 1 | Comp. Ex. 3 | Comp. Ex. 4 |
|---|---|---|---|
| Clarity [a] | 81 (83) | 76 | 78 (78) |
| Gloss [b] | 98 (93) | 97 | 92 (93) |
| Free Shrink (%) [c] (Longitudinal) | 14 (16) | 14 | 15 (12) |
| Free Shrink (%) (Transverse) | 18 (9) | 17 | 8 (8) |
| COF [d] Fresh In/Belt | 0.58 (0.58) | 0.52 | 0.59 (0.62) |
| Seals [e] IN/OUT (pounds) | 7.7 (9.0) | 9.3 | 3.8 (7.1) |
| Surface Energy [f] IN (dyne/cm) | 29 (29) | 33 | 30 (29) |
| Surface Energy OUT (dyne/cm) | 31 (31) | 29 | 31 (30) |

[a] = ASTM D-1746.
[b] = ASTM D2457.
[c] = ASTM D 2732.
[d] = ASTM D1894.
[e] = ASTM F88
[f] = obtained using CAM-FILM-T machine supplied by Tantec, using half angle method.

Ink Adhesion Tests

Ink adhesion tests were performed on the films of Examples 1 and 2 and Comparative Examples 3 and 4. Two different ink and primer systems were analyzed on the film structures: Flexolefin™ primer with Permaflex™ inks, both supplied by Croda Inks Corp., and DRT™ 295 primer with XT-20™ inks supplied by Sun Chemical Specialty Inks. All adhesion tests were administered with 3M Scotch™ #600 pressure sensitive tape. The tape was applied to the film and then immediately removed. Each different area of each sample was analyzed 15 minutes and then 24 hours after printing (inking) and given a numeric value on a scale of 1–5, with 5 being the best adhesion (no ink removal). The results for the films at four days, seven days, and eight days after the date of manufacture of the film are given below in Table II.

TABLE II

Croda Primer and Inks, Four Days after Manufacture

| Film Example | White | Black | White & Black | White, Blue, & Black | White & Blue |
|---|---|---|---|---|---|
| 1 (15 min) | 5 | 4 | 4 | 3 | 3 |
| 1 (24 hr) | 4 | 4 | 4 | 4 | 3 |
| 2 (15 min) | 5 | 5 | 4 | 4 | 3 |
| 2 (24 hr) | 5 | 5 | 4 | 4 | 4 |
| Comp. 4 (15 min) | 4 | 4 | 3 | 2 | 1 |
| Comp. 4 (24 hr) | 4 | 3 | 4 | 3 | 3 |

| Film Example | White | Black | White & Black | White, Blue, & Black | White & Blue |
|---|---|---|---|---|---|
| Croda Primer and Inks, Seven Days after Manufacture |
| 1 (15 min) | 5 | 5 | 4 | 2 | 3 |
| 1 (15 min) (inside)* | 5 | 4 | 3 | 3 | 3 |
| 1 (24 hr) | 5 | 5 | 5 | 5 | 4 |
| 1 (24 hr) (inside) | 5 | 5 | 5 | 5 | 5 |
| 2 (15 min) | 5 | 5 | 4 | 2 | 3 |
| 2 (15 min) (inside)* | 5 | 4 | 3 | 2 | 3 |
| 2 (24 hr) | 5 | 5 | 5 | 5 | 4 |
| 2 (24 hr) (inside) | 5 | 5 | 5 | 5 | 5 |
| Comp. 4 (15 min) | 4 | 5 | 4 | 2 | 2 |
| Comp. 4 (15 min) (inside)* | 3 | 2 | 2 | 2 | 2 |
| Comp. 4 (24 hr) | 5 | 5 | 5 | 4 | 4 |
| Comp. 4 (24 hr) (inside) | 5 | 4 | 3 | 4 | 3 |
| Sun Chemical Primer and Inks, Four Days after Manufacture |
| 1 (15 min) | 4 | 3 | 3 | 3 | 3 |
| 1 (24 hr) | 5 | 4 | 4 | 4 | 3 |
| 2 (15 min) | 5 | 3 | 4 | 3 | 4 |
| 2 (24 hr) | 5 | 3 | 4 | 3 | 4 |
| Comp. 4 (15 min) | 5 | 3 | 2 | 2 | 3 |
| Comp. 4 (24 hr) | 5 | 3 | 2 | 2 | 3 |
| Sun Chemical Primer and Inks, Seven Days after Manufacture |
| 1 (15 min) | 4 | 3 | 3 | 3 | 4 |
| 1 (24 hr) | 5 | 4 | 4 | 4 | 5 |
| 2 (15 min) | 5 | 4 | 3 | 4 | 4 |
| 2 (24 hr) | 5 | 4 | 5 | 5 | 5 |
| Comp. 4 (15 min) | 5 | 4 | 3 | 4 | 4 |
| Comp. 4 (24 hr) | 5 | 4 | 4 | 4 | 5 |
| Sun Chemical Primer and Inks**, Seven Days after Manufacture |
| 1 (15 min) | 5 | 4 | 4 | | 4 |
| 1 (24 hr) | 5 | 4 | 5 | | 5 |
| 2 (15 min) | 5 | 4 | 3 | | 3 |
| 2 (24 hr) | 5 | 5 | 5 | | 5 |
| Comp. 4 (15 min) | 5 | 4 | 4 | | 4 |
| Comp. 4 (24 hr) | 5 | 5 | 5 | | 5 |

| Film Example | White | Black | White & Black | White, Blue, & Black | White & Blue | (AVG) |
|---|---|---|---|---|---|---|
| Croda Primer and Ink, Eight Days after Manufacture |
| 1 (15 min) | 5 | 4 | 4 | 4 | 4 | 4.2 |
| 1 (24 hr) | 5 | 4 | 4 | 5 | 4 | 4.4 |
| Comp. 3 (15 min) | 5 | 5 | 5 | 4 | 4 | 4.6 |
| Comp. 3 (24 hr) | 5 | 5 | 5 | 5 | 4 | 4.8 |
| Comp. 4 (15 min) | 5 | 4 | 4 | 2 | 2 | 3.4 |
| Comp. 4 (24 hr) | 5 | 4 | 4 | 4 | 3 | 4.0 |

| Film Example | White | Blue | White & Blue | White, Blue, & Blue | (AVG) |
|---|---|---|---|---|---|
| Sun Chemical Primer and Ink**, Eight Days after Manufacture |
| 1 (15 min) | 5 | 3 | 4 | 5 | 4.3 |
| 1 (24 hr) | 5 | 4 | 4 | 5 | 4.5 |
| Comp. 3 (15 min) | 5 | 3 | 4 | 4 | 4 |
| Comp. 3 (24 hr) | 5 | 4 | 4 | 4 | 4.3 |
| Comp.4 (15 min) | 5 | 4 | 4 | 5 | 4.5 |
| Comp. 4 (24 hr) | 5 | 4 | 5 | 5 | 4.8 |

*These samples were taken from the film at least three layers into the roll.
**The primer employed in these series of tests was modified following packaging tests discussed below.

Machinability Tests

The machinability of the films of Example 1 and Comparative Example 4 was tested by performing a packaging run on an Ossid 500 tray overwrap system at package per minute speeds of 30, 50 and 60 ppm. The Ossid 500 is a commonly employed in-line or horizontal form-fill-seal machine. It stretches film around a trayed product, forms a tube of the film, cuts the film into package segments, and folds the film ends tightly underneath the tray. The film is then sealed in a sealing unit and shrunk in a hot water tunnel. Film machinability is critical on the Ossid 500 because the folds must remain in place until the package exits the base machine and enters the sealing unit for sealing. A proper balance between film-to-film cling without film-to-machine cling is necessary. The results in terms of percent defects for each of the present films are set forth in Table III below. Results of additional packaging runs are included in parentheses. The film of Comparative Example 3 was tested only at a packaging speed of 50 ppm but was found to have an unacceptably high defect rate of 32.8%. It was found to be another unexpected benefit of the present inventive film that machinability was improved as compared to that of the prior art film.

TABLE III

| Film Example | 30 ppm | 50 ppm | 60 ppm |
|---|---|---|---|
| 1 | 0.4% | 0.6% (1.1%) | 0.8% (1.1%) |
| Comp. 4 | 1.7% | 1.6% (0.4%)(1.8%) | 8.3% (9.6%) |

Package Tightness Retention Tests

Package tightness retention is a measure of how well a package retains a tight appearance after being exposed to conditions which are typical for a commercial distribution cycle. In order to compare and evaluate package tightness retention the following test was performed.

Packages of chicken breasts were produced on an Ossid 500 system as discussed above. They were placed on the bottom layer of boxes and covered with packages which contained only water to simulate the weight of other like-filled packages. The boxes were refrigerated for three days. Then, the chicken-containing packages were unboxed and arranged for evaluation. One package wrapped with each film being tested was set out for evaluators to choose the best and worst from each group. In addition, each package was scored independently by each evaluator. That is, each package was given a score of 1–5, with five indicating a very tight freshly packaged appearance and with 1 indicating an unacceptably loose package, by each evaluator. For purposes of the present study, ten evaluators performed both the ranking and the scoring evaluations.

Also included in the present test was a further commercially available, comparative film, referred to in Table IV, below, as Comparative Film A. Thus, in evaluating the ranking data obtained, each package was scored with a 1 for being ranked as the best package in its group, a 3 for being ranked as the worst and a two for being neither worst nor best.

TABLE IV

| Score Evaluation Results | | Ranking Evaluation Results | |
|---|---|---|---|
| Film | Score | Film | Score |
| 1 | 4.01 | 1 | 1.70 |
| Comp. 4 | 2.51 | Comp. 4 | 2.90 |
| Comp. A | 4.16 | Comp. A | 1.40 |

Press Trial

A press trial was conducted on the films of Example 1 and Comparative Example 4 with a combination of three primers and two ink systems. The third primer was also supplied by Croda Inks and designated Croda New Flexolefin™. All adhesion tests were administered with 3M Scotch™ #600 pressure sensitive tape, and tested in several different areas of the sample. The tape was applied to the film and then immediately removed. The different areas of each sample were analyzed after 15 minutes and then 24 hours after printing, and given a numeric value on a scale of 1–5, with 5 being the best adhesion (no ink removal). The results are set forth in Table V below.

TABLE V

| Film | Red, White & Blue Stripes | Red Block | Blue Block | Yellow Block | Average Score |
|---|---|---|---|---|---|
| Croda System | | | | | |
| 1(15 min) | 3 | 3 | 2 | 3 | 2.8 |
| 1(24 hrs) | 4 | 3 | 3 | 4 | 3.5 |
| 1(72 hrs) | 5 | 3 | 5 | 5 | 4.5 |
| 1(packaged) | 4 | 4 | 5 | 5 | 4.5 |
| Comp. 4 (15 min) | 2 | 1 | 2 | 1 | 1.5 |
| Comp. 4 (24 hrs) | 1 | 2 | 2 | 2 | 1.8 |
| Comp. 4 (72 hrs) | 3 | 2 | 4 | 5 | 3.5 |
| Comp. 4 (packaged) | 3 | 2 | 2 | 3 | 2.5 |
| Croda System with New Primer | | | | | |
| 1(15 min) | 2 | 1 | 2 | 2 | 1.8 |
| 1(24 hrs) | 4 | 4 | 4 | 4 | 4.0 |
| Comp. 4 (15 min) | 1 | 1 | 1 | 1 | 1.0 |
| Comp. 4 (24 hrs) | 3 | 3 | 3 | 3 | 3.0 |
| Sun Chemical System | | | | | |
| 1(15 min) | 4 | 4 | 5 | 5 | 4.5 |
| 1(24 hrs) | 4 | 4 | 5 | 5 | 4.5 |
| 1(72 hrs) | 4 | 4 | 5 | 4 | 4.3 |
| 1(packaged) | 4 | 4 | 4 | 4 | 4.0 |
| Comp. 4 (15 min) | 4 | 3 | 4 | 5 | 4.0 |
| Comp. 4 (24 hrs) | 4 | 3 | 4 | 5 | 4.0 |
| Comp. 4 (72 hrs) | 5 | 3 | 5 | 5 | 4.5 |
| Comp. 4 (packaged) | 3 | 3 | 3 | 3 | 3.0 |

EXAMPLE 5

In accordance with the present invention, a five layer film was coextruded having the following structure and relative percent thickness:

LLDPE1 / EVA2 / LLDPE1 / EVA2 / LLDPE1

16.67% / 25% / 16.66 / 25% / 16.67% wherein LLDPE1 is the Escorene LL3001.63 and EVA2 is Chevron PE 5269T. The tape was electronically crosslinked at approximately 104 kGy and oriented at an orientation ratio of 3.3:1 longitudinally by 3.3:1 in the transverse direction. Prior to crosslinking, one of the outer surfaces was treated with a silicone spray at 9.2 mg/ft$^2$. The film was slit and taken up in single wound rolls such that the silicone treated outer layer was immediately adjacent to the untreated layer on the roll. This film was compared for physical properties with the film of Comparative Example 4. The results appear in Table VI.

TABLE VI

| Properties | Comp. Ex. 4 | Example 5 |
|---|---|---|
| Nominal Gauge (mil) | 0.62 | 0.62 |
| Haze (%) [g] | 1.7 | 0.7 |
| Gloss (%) | 83 | 94 |
| Clarity (%) | 83 | 85 |
| Tensile Strength (psi) (L/T) [h] | 14200/10800 | 13400/14000 |
| Elongation (%) (L/T) [i] | 185/181 | 110/150 |
| Modulus (psi) (L/T) [j] | 28100/31900 | 27800/27600 |
| Tear Propagation (g/mil)(L/T) [k] | 14.3/16.4 | 177/184 |
| Shrink Tension (L/T) [l] | | |
| psi @ 160° F. | 210/136 | 230/300 |
| psi @ 180° F. | 229/227 | 293/388 |
| psi @ 200° F. | 204/299 | 404/442 |

TABLE VI-continued

| Properties | Comp. Ex. 4 | Example 5 |
| --- | --- | --- |
| psi @ 220° F. | 244/304 | 462/452 |
| Free Shrink (L/T) | | |
| % @ 160° F. | 9/3 | 6/10 |
| % @ 180° F. | 13/12 | 10/19 |
| % @ 200° F. | 18/22 | 22/35 |
| % @ 220° F. | 39/41 | 42/51 |
| Instrumented Impact [m] | | |
| Peak Load (lb/mil) [n] | 20 | 23 |
| Energy to Break (ft-lb/mil) [o] | 1.2 | 0.92 |
| Ball Burst Impact (cm kg/mil)[p] | 48 | 39 |

[g] = ASTM D 1003 method A
[h] = ASTM D 882
[i] = ASTM D 882
[j] = ASTM D 882

TABLE VI-continued

| Properties | Comp. Ex. 4 | Example 5 |
| --- | --- | --- |

[k] = ASTM D 1938
[l] = ASTM D 2838
[m] = ASTM D 882
[j] = ASTM D 882

The tear propagation values for the inventive film of Example 5 were more than ten times greater than that of the film of Comp. Ex.4. This was an unexpected and very desirable advantage of the present film. Preferred films have a tear propagation of between 20 and 200 grams, preferably between 100 and 200 grams.

Package Tightness Retention Tests for Example 5 Film

The product used in this test was fresh, cut-up chicken in #8 trays wrapped on an Ossid 500 packaging machine at a commercial poultry processing plant. Six cases of the chicken were wrapped in the film of Comparative Example 4, and six cases of the chicken were wrapped in the film of Example 5. The chicken was wrapped by plant personnel, sent through a chill process, and shipped on a tractor/ trailer to a supermarket distribution center. The product was picked up there at the distribution center, and transported to the test site. The packaged products were evaluated by a selected panel in three test groups (C, D, and E). Only the four packages in the bottom layer of each three-layer case were evaluated as these were likely to be the loosest. Packages were displayed in a single layer in the 38° F. cooler.

Packages were evaluated over several days to determine whether or not the films would tighten up in the display case over time with no weight on them. Packages were scored independently by each evaluator. That is, each package was given a score of 1 to 5, with 5 indicating a very tight, freshly packaged appearance, and with 1 indicating an unacceptably loose package, by each evaluator. A score of 4 or better is considered an acceptable package in the retail case.

The film of Example 5 consistently scored better for package tightness than did the film of Comp. Ex. 4. Table VII shows the average daily scores. In Table VII, "day" indicates the number of days the packages have been out of the poultry plant chiller, and in the 38° F. cooler. The letters next to the numbers represent statistically significant differences between the averages of the two films at the p=0.05 level.

TABLE VII

Average Package Tightness Scores for Bottom Layer Packages in Cases

| | | Day 5 | Day 6 | Day 7 | Day 8 | Day 9 | Day 10 | Day 11 | Day 12 | Day 13 | Day 14 |
| --- | --- | --- | --- | --- | --- | --- | --- | --- | --- | --- | --- |
| Group C | Film 4 | 4.3b | 4.6b | 4.4b | 4.7b | | | | | | |
| | Film 5 | 4.7a | 4.8a | 4.7a | 5.0a | | | | | | |
| Group D | Film 4 | | | 3.8b | 4.1b | | | 4.5b | 4.5b | | |
| | Film 5 | | | 5.0a | 4.8a | | | 5.0a | 5.0a | | |
| Group E | Film 4 | | | | | | | 3.7b | 4.0b | 4.1b | 3.9b |
| | Film 5 | | | | | | | 4.8a | 4.9a | 4.9a | 4.8a |

Press Trial for Example 5 Film

Press trials were conducted on the films of Example 5 and Comparative Example 4 with three different ink systems and at three different commercial printing facilities. Although the film of Comparative Example 4 was not printed at the same time at each printer, the poor results obtained at Printer B were typical. All adhesion tests were administered with 3M Scotch #600 pressure sensitive tape, and tested in several different areas of the sample. The tape was applied to the film and then immediately removed. The different areas of each sample were analyzed after several days and given a numeric value on a scale of 1 to 5, with 5 being the best adhesion (no ink removal). The results are set forth in Table VIII below.

TABLE VIII

| Printer | Primer | Ink | Example 5 Adhesion After Aging (hours) | Comp. Ex. 4 Adhesion After Aging (hours) |
| --- | --- | --- | --- | --- |
| A | Croda | Croda | 4.5 (96) | — |
| B | Carolina Solvents | Croda | 4.9 (24) | 3.8 (24) |
| C | SICPA | SICPA | 4.8 (24) | — |

The foregoing description has been presented for purposes of illustration and description. It is not intended to be exhaustive or to limit the invention to the precise form disclosed, and modifications and variations are possible in light of the above teachings.

We claim:

1. A polymeric film, the film having two major surfaces, consisting essentially of a copolymer of ethylene and a $C_4$ to $C_{10}$ alpha olefin, wherein the two major surfaces each have a silicone coating of between 0.1 and 1.2 mg/ft$^2$.

2. The film of claim 1 wherein the copolymer of ethylene and a $C_4$ to $C_{10}$ alpha olefin consists essentially of ethylene/hexene copolymer.

3. The film of claim 1 wherein the film is crosslinked.

4. The film of claim 1 wherein the film is oriented.

5. The film of claim 4 wherein the film is heat shrinkable.

6. The film of claim 1 wherein the outer surface having the silicone coating has adhered thereto a printing ink.

7. A multilayer polymeric film, the film having two major surfaces, comprising:
   a) a first outer layer consisting essentially of a copolymer of ethylene and a $C_4$ to $C_8$ alpha olefin;
   b) a second outer layer consisting essentially of a copolymer of ethylene and a $C_4$ to $C_8$ alpha olefin; and
   c) a core layer, disposed between the first and second outer layers, comprising an olefinic polymer different from the copolymer of the first and second outer layers;
   wherein the two major surfaces of the film each have a silicone coating of between 0.1 and 1.2 $mg/ft^2$.

8. The film of claim 7 wherein the copolymer of the first and second outer layers consists essentially of ethylene/hexene copolymer.

9. The film of claim 7 wherein the olefinic polymer of the core layer comprises a polymer selected from the group consisting of low density polyethylene, high density polyethylene, ethylene/vinyl acetate copolymer, ethylene/acrylate copolymer, ethylene/acrylic acid copolymer, a metal neutralized salt of ethylene/acrylic acid copolymer, a metal neutralized salt of ethylene/methacrylic acid copolymer; ethylene/alpha-olefin copolymer, polypropylene, propylene/ethylene copolymer, and thermoplastic polyolefin (TPO) resin.

10. The film of claim 9 wherein the olefinic polymer of the core layer comprises ethylene/vinyl acetate copolymer.

11. The film of claim 7 wherein the film is crosslinked.

12. The film of claim 7 wherein the film is oriented.

13. The film of claim 12 wherein the film is heat shrinkable.

14. The film of claim 7 wherein the outer surface having the silicone coating has adhered thereto a printing ink.

15. A multilayer polymeric film, the film having two major surfaces, comprising:
   a) a first outer layer consisting essentially of a copolymer of ethylene and a $C_4$ to $C_{10}$ alpha olefin;
   b) a first intermediate layer comprising an olefinic polymer;
   c) a core layer comprising a copolymer of ethylene and a $C_3$ to $C_{10}$ alpha olefin;
   d) a second intermediate layer comprising an olefinic polymer; and
   e) a second outer layer consisting essentially of a copolymer of ethylene and a $C_4$ to $C_{10}$ alpha olefin;
   wherein the olefinic polymer of the first and second intermediate layers, differs from the copolymer of the first and second outer layers, and the core layer; and
   wherein the two major surfaces of the film each have a silicone coating of between 0.1 and 1.2 $mg/ft^2$.

16. The film of claim 15 wherein the copolymer of the first and second outer layers consists essentially of ethylene/hexene copolymer.

17. The film of claim 15 wherein the olefinic polymer of the intermediate layers comprises a polymer selected from the group consisting of low density polyethylene, high density polyethylene, ethylene/vinyl acetate copolymer, ethylene/acrylate copolymer, ethylene/acrylic acid copolymer, a metal neutralized salt of ethylene/acrylic acid copolymer, a metal neutralized salt of ethylene/methacrylic acid copolymer; ethylene/alpha-olefin copolymer, polypropylene, propylene/ethylene copolymer, and thermoplastic polyolefin (TPO) resin.

18. The film of claim 15 wherein the film is crosslinked.

19. The film of claim 15 wherein the film is oriented.

20. The film of claim 19 wherein the film is heat shrinkable.

21. The film of claim 15 wherein the outer surface having the silicone coating has adhered thereto a printing ink.

22. A method of making a film comprising:
   a) extruding a tubular polymeric film, the film having two major surfaces, consisting essentially of a copolymer of ethylene and a $C_4$ to $C_{10}$ alpha olefin;
   b) coating one major surface of the extrudate with a coating of silicone at a concentration of between 1 and 10 $mg/ft^2$;
   c) slitting the tubular film to create two plies;
   d) separating each ply; and
   e) winding each ply onto a separate take-up roll such that silicone from the coated surface transfers to the other major surface of the film.

23. The method of claim 22 further comprising printing the surface of the film containing the silicone, with a printing ink.

* * * * *